United States Patent
Sato et al.

(10) Patent No.: US 8,336,264 B2
(45) Date of Patent: Dec. 25, 2012

(54) INSTALLATION STRUCTURE OF EXTERIOR WALL DECORATIVE SHEETS

(75) Inventors: Akio Sato, Shiroi (JP); Koichi Okunogi, Shiroi (JP); Masafumi Okawa, Shiroi (JP)

(73) Assignee: Kikukawa Kogyo Co., Ltd., Shiroi-shi, Chiba (JP)

( * ) Notice: Subject to any disclaimer, the term of this patent is extended or adjusted under 35 U.S.C. 154(b) by 65 days.

(21) Appl. No.: 13/057,106

(22) PCT Filed: Sep. 21, 2010

(86) PCT No.: PCT/JP2010/066330
§ 371 (c)(1),
(2), (4) Date: Feb. 1, 2011

(87) PCT Pub. No.: WO2011/086729
PCT Pub. Date: Jul. 21, 2011

(65) Prior Publication Data
US 2011/0283635 A1    Nov. 24, 2011

(30) Foreign Application Priority Data
Jan. 15, 2010    (JP) .................................. 2010-007044

(51) Int. Cl.
*E04D 13/18*    (2006.01)
*E04B 2/00*    (2006.01)
(52) U.S. Cl. ... 52/173.3; 52/235; 52/506.01; 52/506.06; 52/506.05
(58) Field of Classification Search .................... 52/235, 52/489.1, 506.1, 506.01, 506.05, 506.06, 52/509.07, 506.08, 506.09, 510, 586.2, 508, 52/483.1, 173.3
See application file for complete search history.

(56) References Cited

U.S. PATENT DOCUMENTS

| | | | | |
|---|---|---|---|---|
| 4,483,122 A * | 11/1984 | Crandell | ...................... | 52/747.1 |
| 5,301,484 A * | 4/1994 | Jansson | .......................... | 52/235 |
| 6,098,364 A * | 8/2000 | Liu | ............................. | 52/506.08 |
| 6,170,214 B1 * | 1/2001 | Treister et al. | .................. | 52/511 |
| 2003/0150179 A1* | 8/2003 | Moreno | ........................ | 52/235 |
| 2005/0246983 A1* | 11/2005 | Loyd | .............................. | 52/235 |
| 2008/0155908 A1* | 7/2008 | Nomura et al. | .............. | 52/173.3 |
| 2008/0155917 A1* | 7/2008 | Bilge | ............................. | 52/235 |

FOREIGN PATENT DOCUMENTS

| | | |
|---|---|---|
| JP | 53-58123 | 5/1978 |
| JP | 2-41210 | 2/1990 |
| JP | 2-229354 | 9/1990 |
| JP | 7-119275 | 5/1995 |
| JP | 7-39248 | 9/1995 |

* cited by examiner

*Primary Examiner* — Basil Katcheves
*Assistant Examiner* — Beth Stephan
(74) *Attorney, Agent, or Firm* — Merchant & Gould P.C.

(57) ABSTRACT

The present invention provides an installation structure of exterior wall decorative sheet (1) possible for easily installing a wall surface (W) of the exterior wall decorative sheet (1), preventing the exterior wall decorative sheet (1) from moving upwards. It includes a plurality of solar panels (3), which is an exterior wall decorative sheet (1), a lower runner (2) holding the plurality of solar panels (3) at a lower side thereof, and an upper runner (2) holding the plurality of solar panels (3) at an upper side. The upper runner (2) includes a fixed portion (21) fixed to the wall surface (W), a rotating portion (22) attaching a base side thereof vertically and rotatably to the fixed portion (21), and an upper engaging portion (23) provided in a tip side of the rotating portion (22), engaged with the solar panel (3) by rotating the rotating portion (22) downwards, and disengaged with the solar panel (3) by rotating the rotating portion (22) upwards.

2 Claims, 7 Drawing Sheets

INSTALLATION STRUCTURE OF EXTERIOR WALL DECORATIVE SHEETS

This application is a National Stage Application of PCT/JP2010/066330, filed 21Sep. 2010, which claims benefit of Ser. No. 2010-007044, filed 15 Jan. 2010 in Japan and which applications are incorporated herein by reference. To the extent appropriate, a claim of priority is made to each of the above disclosed applications.

FIELD OF THE INVENTION

The present invention relates to an installation structure of exterior wall decorative sheet for installing an exterior wall decorative sheet on a wall surface of buildings.

BACKGROUND ART

Conventionally, a wall surface of buildings has been covered and decorated by exterior wall decorative sheets. In recent years, so-called solar panel constituted by attaching solar cell elements to the exterior wall decorative sheets has been provided to generate electric power as well as the decoration. In particular, a photovoltaic power generation has been remarked as an ecological energy, independent of fossil fuels.

For example, Japanese Utility Model Laid-open Publication No. 22755 of 63 (Showa) discloses an installation structure of exterior wall decorative sheet to install holding members having a substantially letter "L" in section at upper and lower positions on a wall surface of a building and a plurality of connectors at an upper end of the holding member. On the other hand, it discloses the installation structure to install engagement strips at upper end of the holding member on a back surface of the exterior wall decorative sheet (solar panel) having built-in solar cell elements and an output terminal connected to a connector of the holding member in the engagement strip. Furthermore, it also discloses the installation structure to install wire collection connected among a plurality of connectors along the holding member, fix mechanically a plurality of exterior wall decorative sheets through the engagement strips to the holding member, and also connect electrically among solar cell elements attaching to a plurality of exterior wall decorative sheets.

SUMMARY OF THE INVENTION

Problem to be Solved by the Invention

It is, however, likely to disengage between the holding member and the engagement strip, for example, in case that load directed to an upper direction functions on wall materials at the time of earthquake as an installation structure of exterior wall decorative sheet described in the above publication is constituted to insert a groove of the engagement strip projecting downwards from a rear surface of the exterior wall decorative sheet into an upper end of the holding member having a substantially letter "L".

In case that a fixing means for restricting to move upwards from the decorative sheet is installed besides the holding member, it has a problem to take much in work for carrying out the fixing means and results in increasing construction costs or material costs.

The installation structure in the above publication is constituted to install a connector at an upper end of the holding member having a substantially letter "L" and an output terminal at an engagement strip of the exterior wall decorative sheet engaging with the holding member. As a result, it has a problem to be likely to disengage a connection between the connector and the output terminal in case where an engagement between the holding member and the engagement strip is disengaged. It is troublesome and difficult to carry out a waterproof sealing around the output terminal, and then it has a problem in waterproof property thereof. When a waterproof sealing is interposed between the holding member and the engagement strip in case of carrying out the waterproof sealing, it is likely to decrease a strength of mechanical connection between the holding member and the engagement strip and decrease a strength of electrical connection between the connector and the output terminal.

With reference to the above problems, an object of the present invention is to provide an installation structure of exterior wall decorative sheet possible for easily installing the exterior wall decorative sheet on wall surfaces, preventing the exterior wall decorative sheet from moving upwards.

Means for Solving the Problem

The present invention is characterized in that an installation structure of exterior wall decorative sheet comprises a plurality of exterior wall decorative sheets, a lower holding member fixed to a wall surface of a building and holding the plurality of exterior wall decorative sheets at a lower side thereof, and an upper holding member fixed to a wall surface of the building and holding the plurality of exterior wall decorative sheets at an upper side thereof. Further, the upper holding member comprises a fixed portion fixed to the wall surface, a rotating portion attaching the base side thereof vertically and rotatably to the fixed portion, an upper engaging portion provided in a tip side of the rotating portion, engaging with the exterior wall decorative sheet in case of rotating the rotating portion downwards, and disengaging with the exterior wall decorative sheet in case of rotating the rotating portion upwards.

In the above structure, as the present invention is provided with a lower holding member holding a plurality of exterior wall decorative sheets at a lower side and an upper holding member holding the plurality of exterior wall decorative sheets at an upper side, the exterior wall decorative sheets can be held not only at a lower side, but also at an upper side. Accordingly, a movement toward an upper direction of the exterior wall decorative sheet can be effectively prevented in case where loads toward an upper direction affect on the solar panel caused by an earthquake or the like.

In this structure, the upper holding member is provided in a tip side of the rotating portion, is engaged with the exterior wall decorative sheet in case of rotating the rotating portion downwards, and is disengaged with the exterior wall decorative sheet in case of rotating the rotating portion upwards. As a result, the upper holding member results in no hindrance at the time of attaching with the rotating portion rotating upwards, when the exterior wall decorative sheet is held by the lower holding member at a lower side. Thereafter, the upper engaging portion, as provided in a tip of the rotating portion, can be easily engaged by rotating the rotating portion downwards. Furthermore, the gap between the upper engaging portion and the exterior wall decorative sheet can be decreased in area and the noise like rattle can be reduced by decreasing the rotating portion downwards.

The lower holding member provides a lower engaging portion engaging with the exterior wall decorative sheet, each of the exterior wall decorative sheet includes an upper engaged portion engaging with the upper engaging portion and a lower engaged portion engaging with the lower engaging portion. Furthermore, it is preferable that one of the upper engaging portion and the upper engaged portion is provided with a (first) groove, and the other of the upper engaging portion and the upper engaged portion is provided with a (first) protruding member fitting into the (first) groove. And it is also preferable that one of the lower engaging portion and the lower engaged portion is provided with a (second) groove, the other of the lower engaging portion and the lower engaged portion is provided with a (second) protruding member fitting into the (second) groove.

In this structure, the upper engaging portion and the upper engaged portion can be easily engaged and the lower engaging portion and the lower engaged portion can be easily engaged by that the (first or second) groove is engaged with the (first or second) protruding member.

The (first) groove provided in one of the upper engaging portion and the upper engaged portion is preferable to provide a protruding member therein, the protruding member provided in the other of the upper engaging portion and the upper engaged portion is preferable to provide with a notch fitting with the protruding member at a position corresponding to the protruding member.

In this structure, the (first) groove provided in one of the upper engaging portion and the upper engaged portion provides a protruding member therein, the (first) protruding member provided in the other of the upper engaging portion and the upper engaged portion provides with a notch fitting with the protruding member at a position corresponding to the protruding member. Accordingly, the (first) protruding member is engaged with the notch not to deviate the exterior wall decorative sheet in a horizontal direction from the upper holding member when the exterior wall decorative sheet is affected by a horizontal force caused by earthquake or the like. Accordingly, in case where the upper holding member is provided with the holding member-side connector connecting to the solar panel (panel-side connector) to apply, for example, a solar panel as the exterior wall decorative sheet. It is effectively prevented that the holding member-side connector is disengaged with the solar panel.

On the other hand, a force of earthquake can be escaped such that a relative movement is permitted between the lower holding member and the exterior wall decorative sheet. For example, in case where the upper holding member is provided with the holding member-side connector connecting to the solar panel (panel-side connector) to use a solar panel as the exterior wall decorative sheet, the solar panel can be easily aligned relative to the holding member-side connector at the time of assembling, as the solar panel can be slid along the lower holding member.

The upper holding member is preferably constituted to include the lower engaging portion engaging with the other plurality of exterior wall decorative sheets arranged in an upper side of the upper holding member at a tip side of the rotating portion.

In this structure, it is possible to install the other plurality of exterior wall decorative sheets over the upper holding member, as it is possible to use the upper holding member also as the lower holding member. Accordingly, it is possible to install the plurality of exterior wall decorative sheets neighboring not only in a horizontal direction but also in a vertical direction, decreasing a sort of parts.

The plurality of exterior wall decorative sheets are mutually installed at a distance, and it is preferable that the upper holding member is constituted to include a connection portion for connecting the scaffolding binder member at a position corresponding to the gap between the neighboring exterior wall decorative sheets.

As the upper holding member includes a connection portion for connecting the scaffolding binder member at a position corresponding to the gap between the neighboring exterior wall decorative sheets, the temporary scaffolding can be easily fixed through the scaffolding binder member to the upper holding member at the time of installing the exterior wall decorative sheet on a wall surface of a building.

The exterior wall decorative sheet is a solar panel including solar cell elements. Furthermore, the upper holding member is fixed to the fixed portion and is provided with a plurality of holding member-side connectors connecting respectively to the plurality of solar panels and a wire collection connecting between the plurality of connectors toward holding member.

In this structure, as the holding member-side connector is fixed to the fixed portion and is provided as a separate body different from the upper engaging portion, a mechanical connection between the solar panel and the upper engaging portion can be made to rotate the rotating portion downwards, after an electrical connection between the holding member-side connector and the solar panel has been certainly made.

It is preferable that the upper holding member includes a hollow portion surrounded by the rotating portion as rotated downwards and the fixed portion, and the wire collection is installed in the hollow portion.

In this structure, as the wire collection is installed within a hollow portion surrounded by the rotating portion as rotated downwards and the fixed portion, the wire collection can be easily arranged to open the hollow portion by rotating the rotating portion upwards and can be easily protected by rotating the rotating portion downwards.

It is preferable that the solar panel is provided with a panel-side connector connecting to the holding member-side connector, the holding member-side connector and the panel-side connector include connection terminals for mutually connecting, respectively, to surround around the connection terminal by one thereof and include a first sealing member being in contact with the other thereof.

In this structure, as the first sealing member is provided to surround around the connection terminal of the holding member-side connector or the panel-side connector, the connection terminal can be definitely made watertight.

As the holding member-side connector is fixed to the fixed portion provided as a separate body with the upper engaging portion, the first sealing member does not intervene between the upper engaging portion and the solar panel. Then, a decrease of strength of mechanical connection between the upper engaging portion and the solar panel can be effectively prevented.

As the solar panel is attracted to the upper holding member to engage with the solar panel at an upper side by rotating the rotating portion of the upper holding member downwards, the sealing property of the first sealing member can be remarkably improved.

It is preferable that the holding member-side connector and the panel-side connector extend one thereof over the first sealing member and include the second sealing member being in contact with the other thereof, the second sealing member slants to approach closer to the first sealing member as it goes farther from a central position to either ends.

In this structure, as it is provided with the second sealing member extending over the first sealing member, it is protected that the first sealing member is directly exposed to rain and waterproof property of the connection terminals of the holding member-side connector and the panel-side connector can be greatly improved.

As the second sealing member slants to approach closer to the first sealing member as it goes farther from a central portion to either ends, rain or the like can be effectively discharged.

Effect of the Invention

According to the present invention, the installation structure of exterior wall decorative sheet possible for easily installing the exterior wall decorative sheet on a wall surface can be provided to prevent the exterior wall decorative sheet from moving upwards.

BRIEF DESCRIPTION OF THE DRAWINGS

FIG. 4 is a structural view of the runner-side connector.

FIG. 6 is a structural view of panel-side connector.

DETAILED DESCRIPTION OF THE PREFERRED EMBODIMENT

With reference to drawings, a first embodiment of the present invention will be described in detail. Duplicated explanation will be, herein, omitted by numbering the same numerical reference as to the same element. This embodiment explains a case to attach a solar panel to a wall surface of a building as one example in order to be used as an exterior wall decorative sheet.

Figure 1:
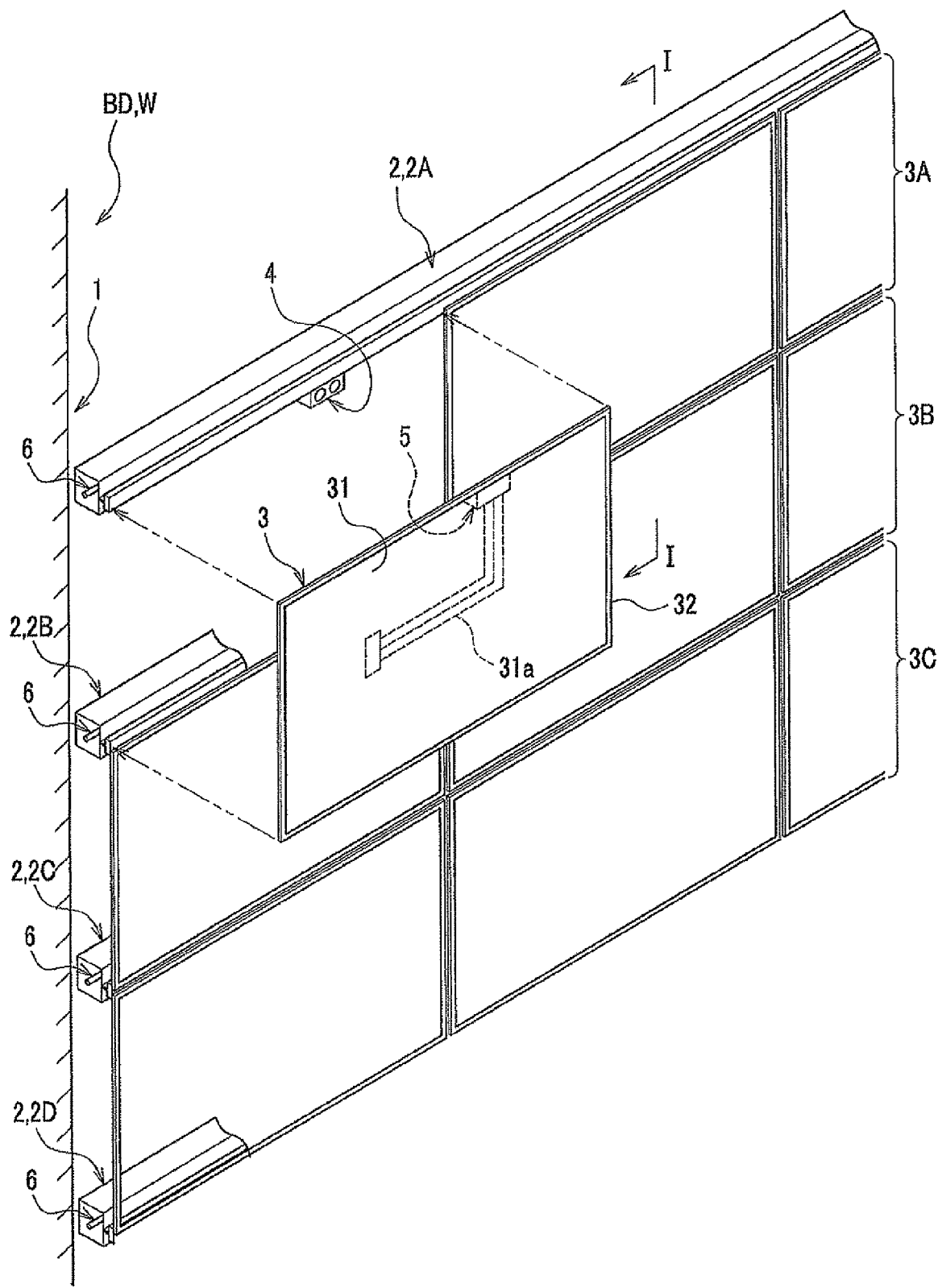
FIG. 1 is an exploded perspective view showing a part of an installation structure of exterior wall decorative sheet relating to this embodiment.

FIG. 1 is an enlarged perspective view showing a part of an installation structure of exterior wall decorative sheet relating to this embodiment.

As shown in FIG. 1, an installation structure of exterior wall decorative sheet 1 relating to this embodiment is constituted to install a plurality of solar panels 3 having a solar cell element 31 on a wall surface W of a building BD. For example, it is designed to decorate an outside appearance of the building BD by covering the wall surface W between windows of the building BD, and save energy of the building BD by photovoltaic power generation. The installation structure of exterior wall decorative sheet 1 is principally constituted to provide with a pair of runners 2 attached to the wall surface W to space a predetermined distance in upper and lower sides, and a plurality of solar panels 3 arranged between the pair of runners 2 neighboring in a horizontal direction. In this embodiment, three installation structures 1 are constituted by four runners 2A, 2B, 2C, and 2D, and a group of solar panels comprising of three stages 3A, 3B, and 3C.

Two runners 2B, 2C in center among four runners 2 are respectively functioned both as "an upper holding member" and "a lower holding member" in Claims. That is, two runners 2B, 2C in center are designed to hold the solar panel 3 installed in the lower side at an upper side and hold the solar panel 3 installed in the upper side at a lower side.

As shown in FIG. 1, each runner 2 includes a plurality of runner-side connectors 4 for respectively connecting to a plurality of solar panels 3, and a wire collection 6 connecting in series to a plurality of runner-side connectors 4 (or a plurality of solar panels 3 neighboring in a horizontal direction). Furthermore, each solar panel 3 has the panel-side connector 5 connecting to the runner-side connector 4 around an upper edge of a surface (rear surface) toward the wall surface W.

Figure 2:
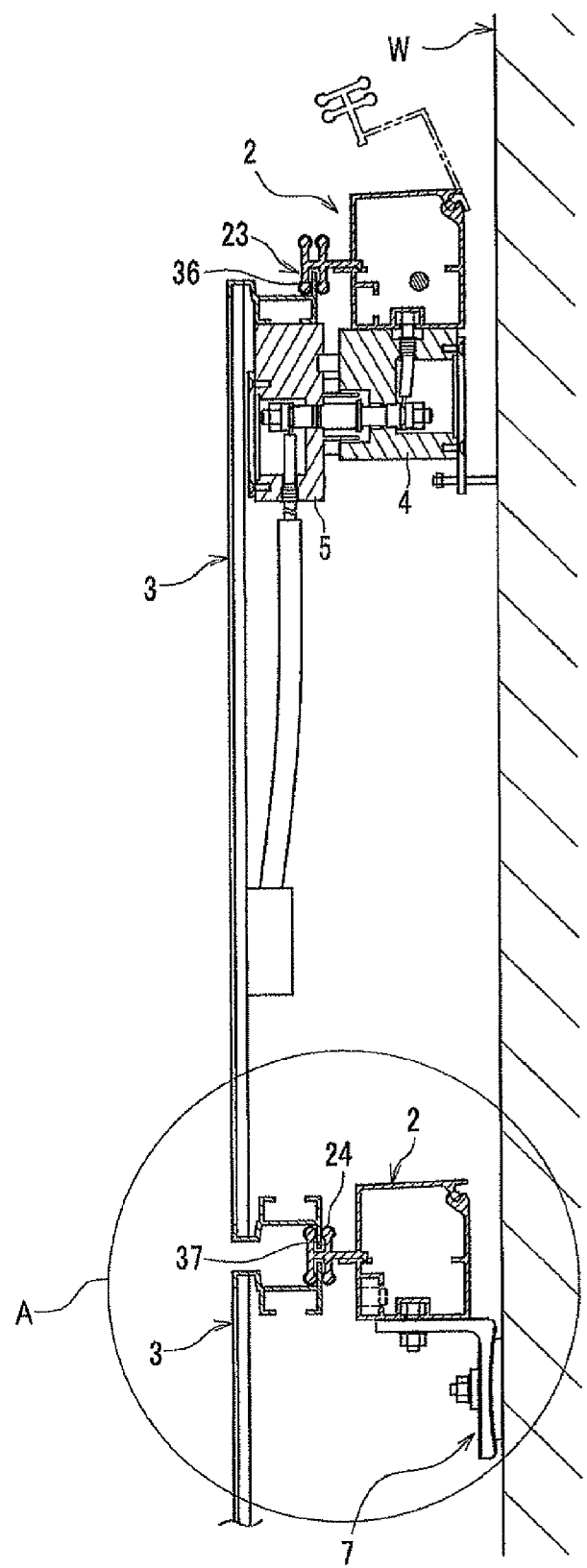
FIG. 2 is a sectional view shown by an arrow and taken along a line I-I in FIG. 1.
Figure 3:
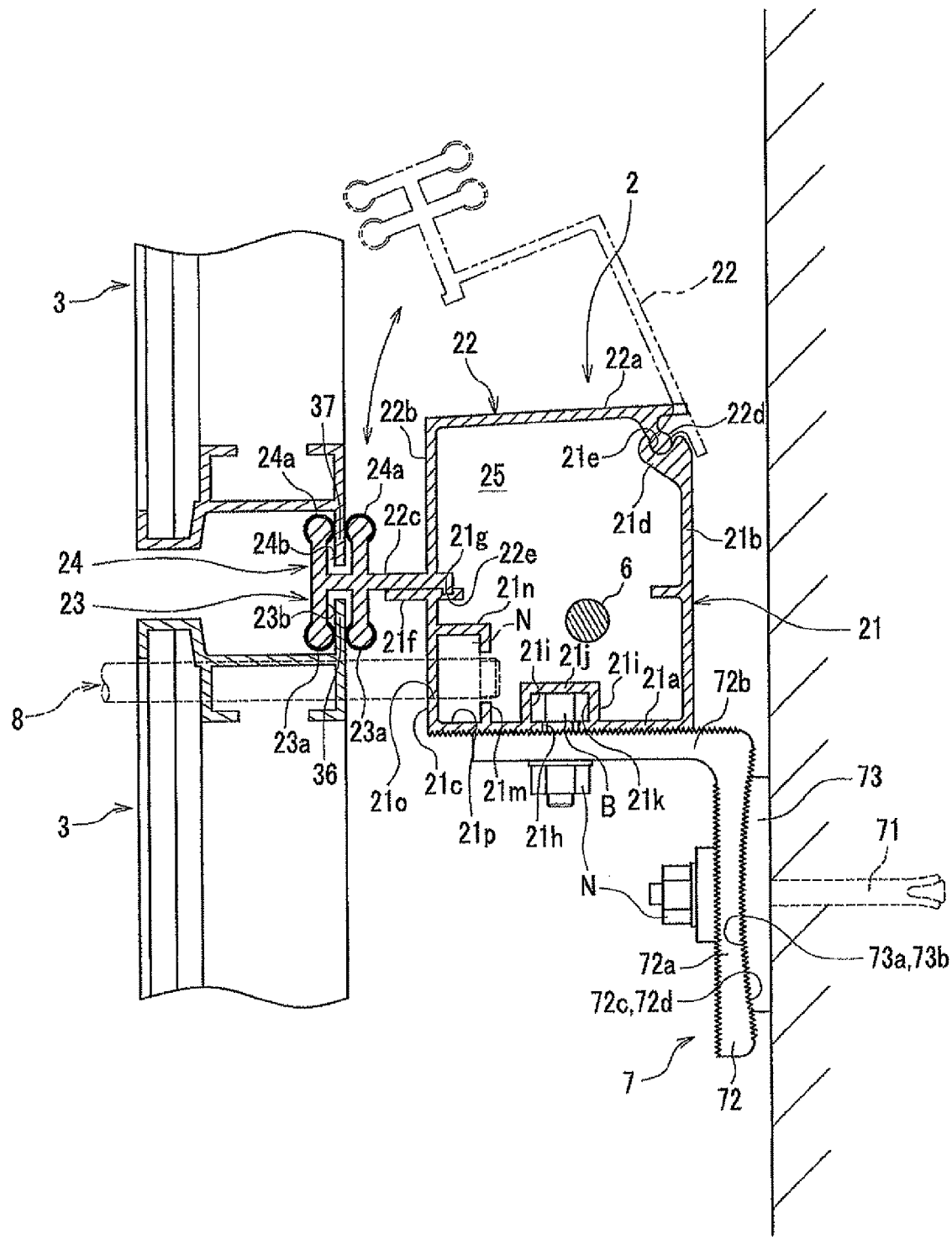
FIG. 3 is an enlarged sectional view showing a Part A in FIG. 2.

FIG. 2 is a view as shown by an arrow and taken along a line I-I. FIG. 3 is an enlarged sectional view of Part A in FIG. 2.

As shown in FIGS. 2 and 3, the runner 2 is designed to function as a so-called base material (furring strip) for attaching the solar panel 3 to the wall surface W in order to use as an exterior wall decorative sheet. Then, it is attached to the wall surface W extending in a horizontal direction. The runner 2 is a long member manufactured by extrusion-forming of material such as aluminum or stainless steel to form like a substantially square tube as seen in section. The runner 2 is fixed through a fastener 7 having a substantially letter reverse "L" to the wall surface W. An explanation about the fastener 7 will be later described.

As shown in FIG. 3, the runner 2 is principally provided with a fixed portion 21 fixed through the fastener 7 to the wall surface W, a rotating portion 22 fixing a base side thereof rotatably to the fixed portion 21, an upper engagement portion 23 provided in a tip side of the rotating portion 22, and a lower engagement portion 24 provided in a tip side of the rotating portion 22 and over the upper engagement portion 23.

The fixed portion 21 is provided with a bottom wall 21a, a rear wall 21b rising from an end toward the wall surface W of the bottom wall 21a, and a front wall 21c rising from an end toward the solar panel 3 of the bottom wall 21a to form like a substantially concave letter as seen in section.

An upper end portion of the rear wall 21b is provided with a swollen portion 21d swelling toward an opposite side of the wall surface W. An upper portion of this swollen portion 21d is provided with a hinge portion 21e having a substantially arcular form as seen in section. The hinge groove 21e is designed to support the base side (toward the wall surface W) of the rotating portion 22 as later described.

The front wall 21c is equal in height to a size equivalent to be substantially half of the rear wall 21b. An upper end portion of the front wall 21c is provided with a contact portion 21f being in contact with a tip side of the rotating portion 22 as later described. The contact portion 21f extends from an upper end portion of the front wall 21c toward the solar panel 3 and a side of the wall surface W, respectively.

A portion extending toward the wall surface W of the contact portion 21f is provided with a fitting groove 21g for partially fitting with the rotating portion 22 as later described.

The rotating portion 22 is principally provided with an upper wall 22a, a pendent wall 22b hanging down from an end toward the solar panel 3 of the upper wall 22a, an extension portion 22c extending from a lower end of the pendent wall 22b toward the solar panel 3, to form a substantially crank as seen in section.

An end toward the wall surface W of the upper wall 22a is provided with a hinge portion 22d extending downwards. A tip portion of the hinge portion 22d is constituted to form a substantially circle as seen in section to connect vertically to a hinge groove 21e formed in the fixed portion 21.

An end toward the wall surface W of the extension portion 22c is provided to extend downwards the engagement portion 22e fitting with the fitting groove 21g formed in the fixed portion 21.

The upper engaging portion 23 is a portion for holding an upper end portion of the solar panel 3 installed in a lower side of the runner 2 at an upper end portion. The upper engaging portion 23 is provided in an end portion toward the solar panel 3 of the extending portion 22c.

The upper engaging portion 23 is constituted by a pair of protruding members 23a provided toward downwards from a lower surface of the extension portion 22c, and a groove 23b formed between the pair of protruding members 23a.

Each tip portion of the pair of protruding members is formed to be substantially circular as seen in section and is coated by a resin film for buffering in its circumferential surface. The groove 23b is designed to engage with an upper engaged portion 36 (Refer to FIG. 2) provided in an upper side of the solar panel 3 as later described when the rotating portion 22 rotates downwards, while it is designed to disengage with the upper engaged portion 36 when the rotating portion 22 rotates upwards.

A lower engaging portion 24, which is a portion for holding a lower end portion of the solar panel 3 installed in an upper side of the runner 2 at a lower side thereof, is provided in an end portion toward the solar panel 3 of the extension portion 22c.

The lower engaging portion 24 is constituted by a pair of protruding members 24a provided toward upwards at an upper surface of the extension portion 22c, and a groove 24b formed between these pair of protruding members 24a.

A tip portion of the pair of protruding members 24a is formed like a substantially circle as seen in section, and is coated by a resin film for buffering in its circumferential surface. The groove 24b engages with a lower engaged portion 37 provided in a lower side of the solar panel 3 as later described.

The runner 2 has a hollow portion 25 surrounded by the rotating portion 22 rotating downwards and the fixed portion 21. The hollow portion 25 is constituted to arrange a wire collection 6 therein, which is connected between the runner-side connectors 4 as later described. As the hollow portion 25 is designed to be open in a longitudinal direction by rotating the rotating portion 22 upwards as shown in a two-dot line in FIG. 3, it is easy to arrange the wire collection 6.

In addition, it is preferable to install the wire collection 6 in advance inside the hollow portion 25 in a factory manufacturing the runner 2 in order to lighten a work burden on the spot.

The runner 2 is provided with a slit 21h being in opening along a longitudinal direction approximately in a center of the bottom wall 21a thereof. The bottom surface 21a is provided with a pair of longitudinal walls 21i positioning astride the slit 21h on an upper surface thereof. The upper ends of a pair of the longitudinal walls 21i is closed by being connected by a lateral wall 21j. It is designed to constitute an engaging groove 21k for engaging with a bolt B fastening the fastener 7 by the slits 21h, the pair of longitudinal walls 21i, and the lateral wall 21j.

An distance between the pair of longitudinal walls 21i is formed to be approximately the same size as a width of a head of the bolt B for fastening the fastener 7. A width of the slit 21h is formed to be smaller in size than the width of the head of the bolt B. That is, the engaging groove 21k has a detent function and a retaining function of the bolt B for fixing the fastener 7.

Next, the fastener 7 will be described with reference to FIG. 3.

The fastener 7, which is a member for fixing the runner 2 on the wall surface W, is principally provided with an anchor bolt 71 attached by striking on the wall surface W, a fastener 72 formed to be reverse letter "L" as seen from side by a vertical strip 72a and a horizontal strip 72b, and an adjustment washer 73 provided between the wall surface W and the fastener 7.

The fastener 7 is fixed on the wall surface W by passing the anchor bolt 71 through and fastening the vertical strip 72a of the fastener 72 and the adjustment washer 73 by a nut N. The fastener 7 is then designed to fix the runner 2 by passing the bolt B, which is mounted in the engagement groove 21k of the runner 2, through the horizontal strip 72b of the fastener 72 and fastening them by the nut N.

The fastener 7 has a function for adjusting a slope of the fastener 72 on the wall surface W.

Specifically, a circular convex curve 73a with its central axis directed in a horizontal direction is formed in a surface of opposite side to the wall surface W of the adjustment washer 73, and a circular concave curve 72c corresponding to the convex curve 73a is formed on a surface toward the wall surface W of the vertical strip 72a of the fastener 72. The vertical strip 72a is provided with a long hole (as not shown) extending vertically for passing through the anchor bolt 71, and a slope of an upper surface of the horizontal strip 72b can be adjusted by shifting vertically the concave curve 72c of the fastener 72 relative to the convex curve 73a of the adjustment washer 73. Then, the runner 2 can be horizontally installed by adjusting a slope of the fastener 72, even where the wall surface W slants caused by a construction error.

The protruding plates 73b, 72d, as mutually engaged, are formed in the convex curve 73a and the concave curve 72c. Then, the fastener 72 never slip until during screwing the nut N in the anchor bolt 71 after shifting and adjusting the fastener 72 relative to the adjustment washer 73. Even after its fastening, it never slips caused by the vibration. The mutually engaged protruding plates are formed in an upper surface of the horizontal strip 72b and a lower surface of the bottom wall 21a of the runner 2, respectively.

As shown in a dotted line in FIG. 3, the front wall 21c of the runner 2 is provided with a scaffolding binder member 8 for fixing the working scaffolding (as not shown). The scaffolding binder member 8, which is a stick of round material made of metal, is installed between the solar panels 3 neighboring in a horizontal direction. An end toward the wall surface W of the scaffolding binder member 8 is connected to the nut N installed within the hollow portion 25 of the runner 2. In addition, the front wall 21c of the runner 2 has the lateral wall 21n at a position spaced upwards from the bottom wall 21a. The front wall 21c has a through hole 21o for passing through the scaffolding binder member 8. The connection portion 21p for connecting the scaffolding binder member 8 to the runner 2 is constituted by the nut N and the through hole 21o, of which the rotation is designed to be stopped by the bottom wall 21a and the lateral wall 21n.

Figure 4A:
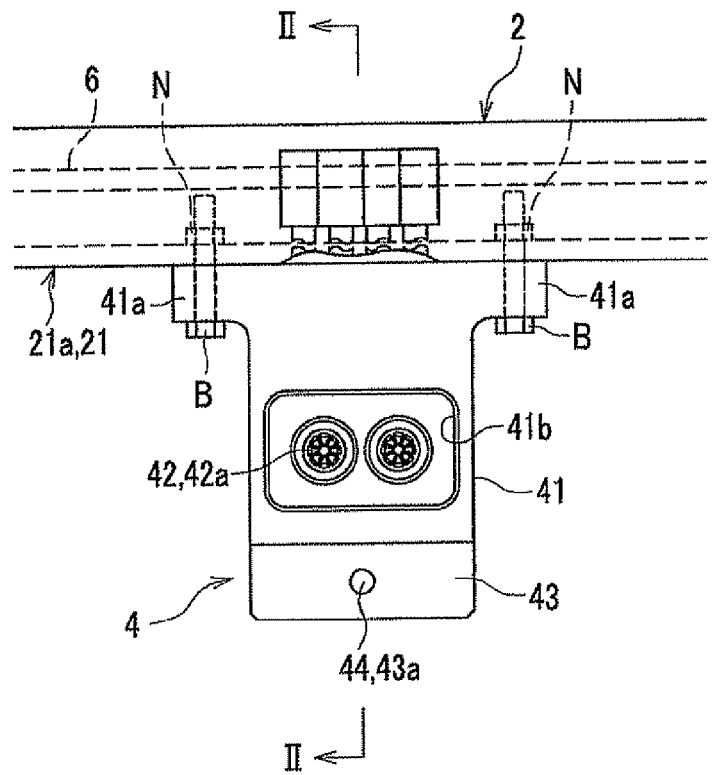
FIG. 4A is a side view as seen from a side of solar panel.
Figure 4B:
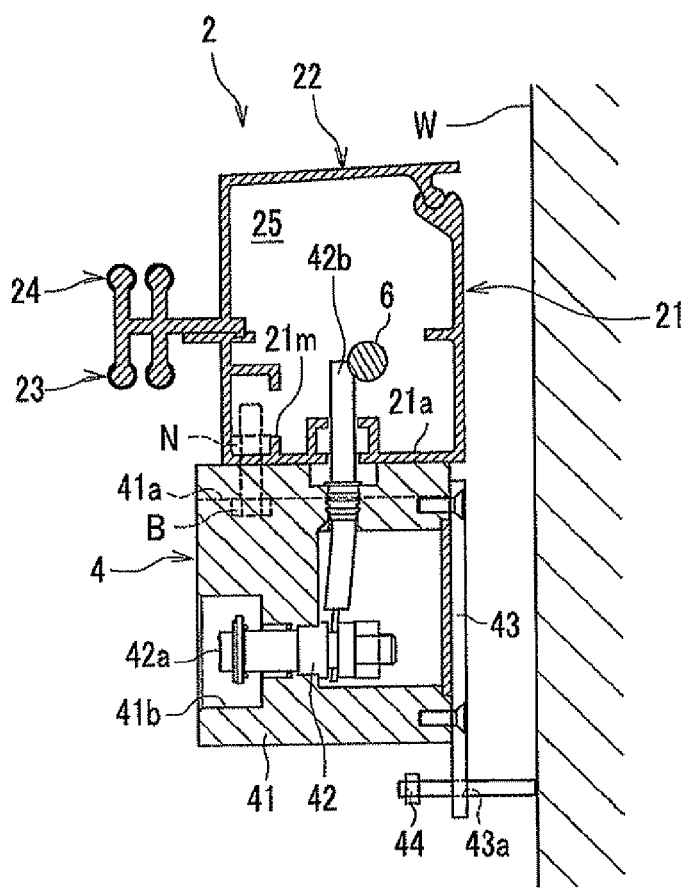
FIG. 4B is a sectional view as shown by an arrow and taken along a line II-II.

FIG. 4 is a structural view of the runner-side connector. FIG. 4A is a side view as seen from a side of the solar panel, and FIG. 4B is a sectional view as seen by an arrow and taken along a line II-II in FIG. 4A.

As shown in FIGS. 2 and 4, the runner-side connector 4 is attached to a lower side of the fixed portion 21 of the runner 2.

The runner-side connector 4 is provided with a connector main body 41, a connection terminal for connecting to the solar panel 3, and a plate 43 and an adjustment screw 44 for supporting the connector main body 41 on the wall surface W.

The connector main body 41, which is a box-typed resin material housing the connection terminal 42, has flange portions 41a extending in a longitudinal direction of the runner 2, respectively. The flange portion 41a is provided with a through hole (as not shown) for passing through the bolt B for fixing. The bottom wall 21a of the runner 2 is provided with a through hole (as not shown) for passing through the bolt B at a position corresponding to a position arranging the runner-side connector 4 as later described.

The connector main body 41 is fastened in the fixed portion 21 of the runner 2 by screwing the nut N in the bolt B passing through a through hole provided in the bottom wall 21a of the runner 2 and a through hole provided in the flange portion 41a.

In addition, the bottom wall 21a is provided with the longitudinal wall 21m (as shown in FIG. 3) at a position spaced toward the wall surface W from the front wall 21c as a detent mechanism of the nut N for fastening the connector main body 41.

The connector main body 41 is provided with a concave portion 41b in a surface toward the solar panel 3 thereof to expose one end 42a of the connection terminal 42 in the outside. While the other end 42b of the connection terminal 42 is designed to extend from an upper surface of the connector main body 41 through an opening (as not shown) provided in the bottom wall 21a of the runner 2 and to be arranged within the hollow portion 25 to connect to the wire collection 6.

As shown in FIG. 4B, a plate 43 is attached to the side surface toward the wall surface W of the connector main body 41. A lower end portion of the plate 43 extends downwards below the connector main body 41. A lower end portion of the plate 43 is provided with a screw hole 43a to be screwed by an adjustment screw 44. A tip portion of the adjustment screw 44 is in contact with the wall surface W. Thus, when the solar panel 3 is pressed against the wall surface W by wind pressure, as the connector main body 41 is supported by the plate 43 and the adjustment screw 44 on the wall surface W, the load affecting a connection point between the runner 2 and the connector main body 41 results in a reduction or an ease thereof.

An amount of extension from the plate 43 of the adjustment screw 44 can be regulated in harmony with a distance between the plate 43 and the wall surface W by rotating the adjustment screw 44.

Figure 5A:
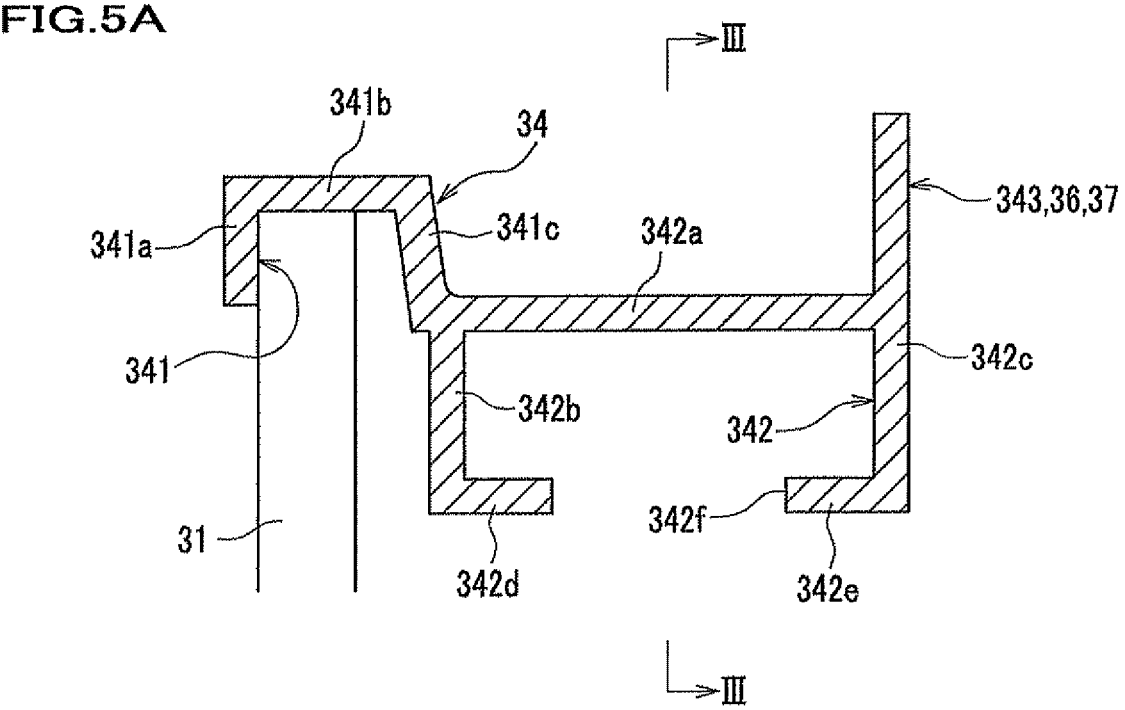
FIG. 5A is an enlarged sectional view around an upper side of the solar panel.
Figure 5B:
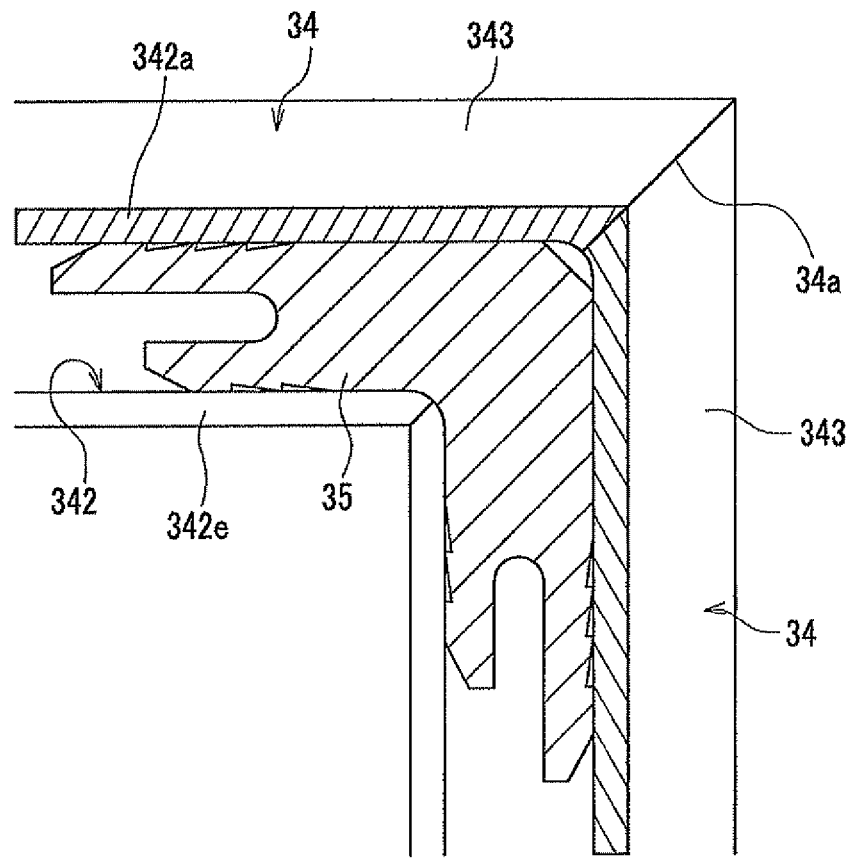
FIG. 5B is a view as shown by an arrow and taken along a line III-III in FIG. 5A.

Next, the solar panel 3 will be described. FIG. 5A is an enlarged sectional view around an upper side of the solar panel. FIG. 5B is a sectional view as seen by an arrow and taken along a line III-III.

As shown in FIGS. 1 and 5, the solar panel 3, which is an exterior wall decorative material for covering and decorating the wall surface W and generating electric power, is principally provided with a solar cell element 31, a frame member 32 attached around the solar cell element 31, and the panel-side connector 5 for outputting electric power generated by the solar cell element 31.

The solar cell element 31 is a device formed like a panel for converting the received light to electric power. The solar cell element 31 is connected through the cable 31a to the panel-side connector 5.

As shown in FIG. 1, the frame member 32 is metal member formed like a square frame for holding around the solar cell element 31. As shown in FIGS. 1 and 5, the frame member 32 is provided with four frame strips 34, and four connection pieces 35 for mutually connecting among the four frame strips 34. In the four frame strips 34, a frame strip 34 attached to an upper end portion of the solar cell element 31 will be described as one example.

As shown in FIG. 5A, the frame strip 34 includes a groove 341 fitting with an edge of the solar cell element 31, an engaging portion 342 fitting with the connection piece 35, and a protruding member 343 as an upper engaged portion fitting with an upper engaging portion 23 of the runner 2. A frame strip 34 is a member manufactured by an extrusion of, for example, aluminum or stainless steel. As shown in FIG. 5B, an end 34a in a longitudinal direction of the frame strip 34 is cut out in a condition as slanted at an angle of 45 degrees.

As shown in FIG. 5A, the groove 341 is formed like a groove opening downwards (toward the solar cell element 31) by the front wall 341a, an upper wall 341b extending toward the wall surface W from an upper end portion of the front wall 341a, and a rear wall 341c, which is an upper engaged portion fitted with the upper engaging portion 23 of the runner 2. The engaging portion 342 is provided with an upper wall 342a extending toward the wall surface W from a lower end portion of the rear wall 341c, the front wall 342b extending downwards from an end portion toward the solar cell element 31 of the upper wall 342a, a rear wall 342c extending downwards from an end toward the wall surface W of the upper wall 342a, a return strip 342d extending toward the wall surface W from a lower end of the front wall 342b of the upper wall 342a, a return strip 342e extending toward the solar cell element 31 from a lower end portion of the rear wall 342c, and a slit 342f formed between the return strip 342d, 342e. A connection piece 35 as later described is inserted into an end portion in a longitudinal direction of the engaging portion 342.

The protruding member 343 is a member formed like a wall rising upwards from an end portion toward the wall surface W of the upper wall 342a of the engaging portion 342.

As shown in FIG. 5B, the connection piece 35 is a member for connecting at a right angle between the frame strips 34 and formed like a letter "L" as seen from side. The connection piece 35 is formed like a substantially same sectional shape as the engaging portion 342 of the frame strip 34 to be fixed by a press-fit technique in the engaging portion 342

The frame member 32 formed like a square frame is formed by arranging such a frame strip 34 to four sides of the solar cell element and connecting at a right angle between two frame strips 34 by the connection pieces 35. Each edge portion of the solar cell element 31 is fitted and fixed in the groove 341 of each frame strip 34, thus to constitute a solar panel 3.

The upper engaged portion 36 of the solar panel 3 is constituted by the protruding member 343 of the frame strip 34 installed along an upper edge of the solar cell element 31. The lower engaged portion 37 of the solar panel 3 is constituted by the protruding member 343 of the frame strip 34 installed along a lower edge of the solar panel 3.

Figure 6A:
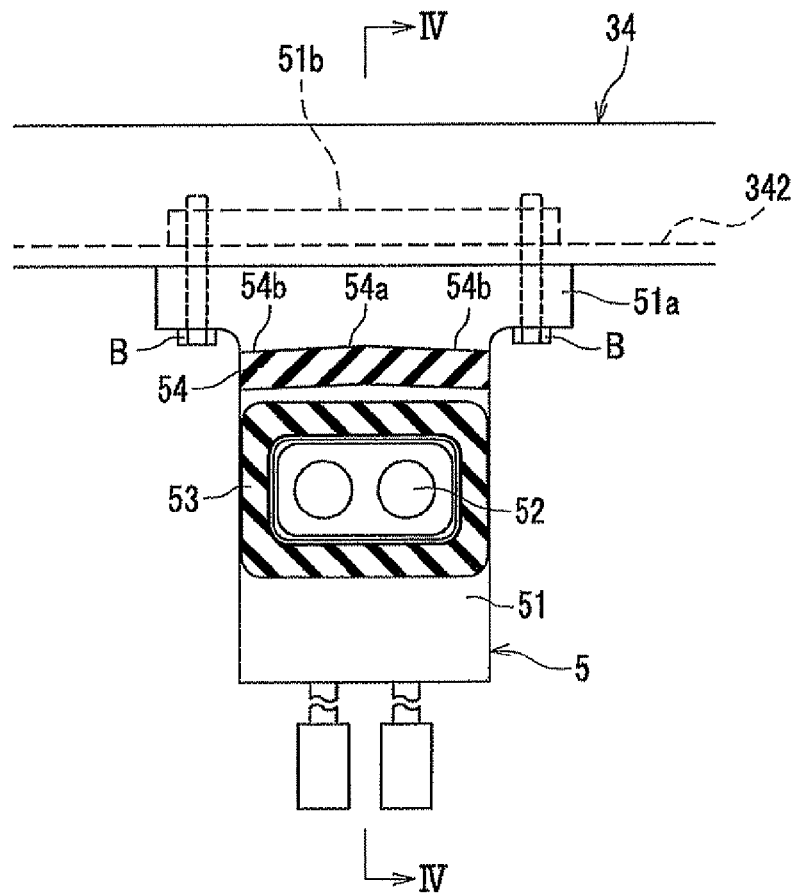
FIG. 6A is a side view as shown from a side of wall.
Figure 6B:
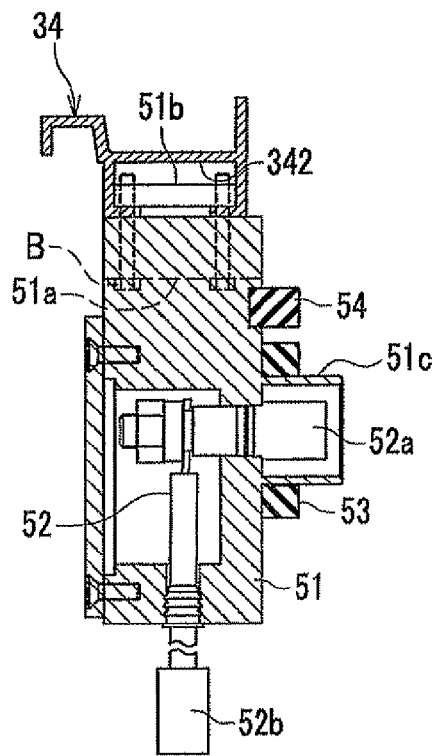
FIG. 6B is a view as shown by an arrow and taken along a line IV-IV in FIG. 6A.

FIG. 6 is a structural view of the panel-side connector. FIG. 6A is a side view as seen from wall surface side, and FIG. 6B is a sectional view as shown by an arrow and taken along a line IV-IV in FIG. 6A.

As shown in FIG. 6, the panel-side connector 5 is provided with a connector main body 51 made of resin, a connection terminal 52 for connecting to the runner-side connector 4, a first sealing member 53 surrounding around the connection terminal 52, and a second sealing member 54 installed over the first sealing member 53.

The connector main body 51, which is formed like a box housing the connection terminal 52 and is made of resin, includes a flange 51a extending in a longitudinal direction of the upper frame strip 34 in both ends, respectively. The flange 51a is provided with a through hole for passing through the bolt B. The connector main body 51 is provided with a plate 51b forming a screw hole in the engaging portion 342 of the upper frame strip 34, and is fixed at a lower side of the upper frame strip 34 by screwing the bolt B, which is passed through a through hole of the flange portion 51a, into a screw hole of the plate 51b.

One end 52a of the connection terminal 52 is designed to extend from a side surface toward the wall surface W of the connector main body 51, and connect to the connection terminal 42 of the runner-side connector 4 when the panel-side connector 5 is connected to the runner-side connector 4.

The other end 52b of the connection terminal 52 extends from a lower surface of the connector main body 51 and connects to an output cable of the solar cell element 31.

In addition, a side surface toward the wall surface W of the connector main body 51 is provided with a circumferential wall 51c formed like a square tube to surround around one end 52a of the connection terminal 52. The circumferential wall 51c is designed to fit into a concave portion 41b when the panel-side connector 5 is connected to the runner-side connector 4.

The first sealing member 53, which is an annular elastic member made of, for example, rubber or the like, is installed to surround around the connection terminal 52 (more specifically, around the circumferential wall 51c) in a side surface toward the wall surface W of the connector main body 51. The first sealing member 53 is designed to seal a gap between the both by being in contact with the runner-side connector 4 when the panel-side connector 5 is connected to the runner-side connector 4.

The second sealing member 54, which is a linear elastic member made of rubber or the like, is installed on a side surface toward the wall surface W of the connector main body 51 and over the first sealing member 53. The second sealing member 54 is designed to seal a gap between the both by being in contact with the runner-side connector 4 when the panel-side connector 5 is connected to the runner-side connector 4. As shown in FIG. 6A, the second sealing member 54 is constituted to slant such that it approaches closer to the first sealing member 53 as it goes farther from the central portion 54a to either ends 54b. As a result, drops of rain reaching on the second sealing member 54 can be discharged from the either ends of the second sealing member 54 to prevent drops of rain from reaching the first sealing member 53.

Figure 7A:
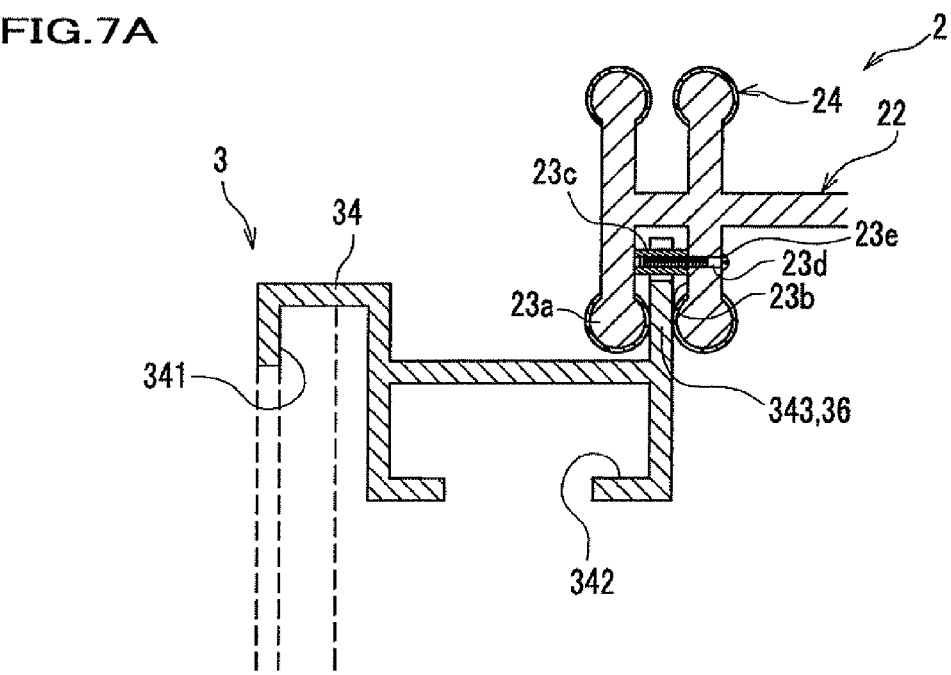
FIG. 7A is an enlarged sectional view around an upper engagement portion.
Figure 7B:
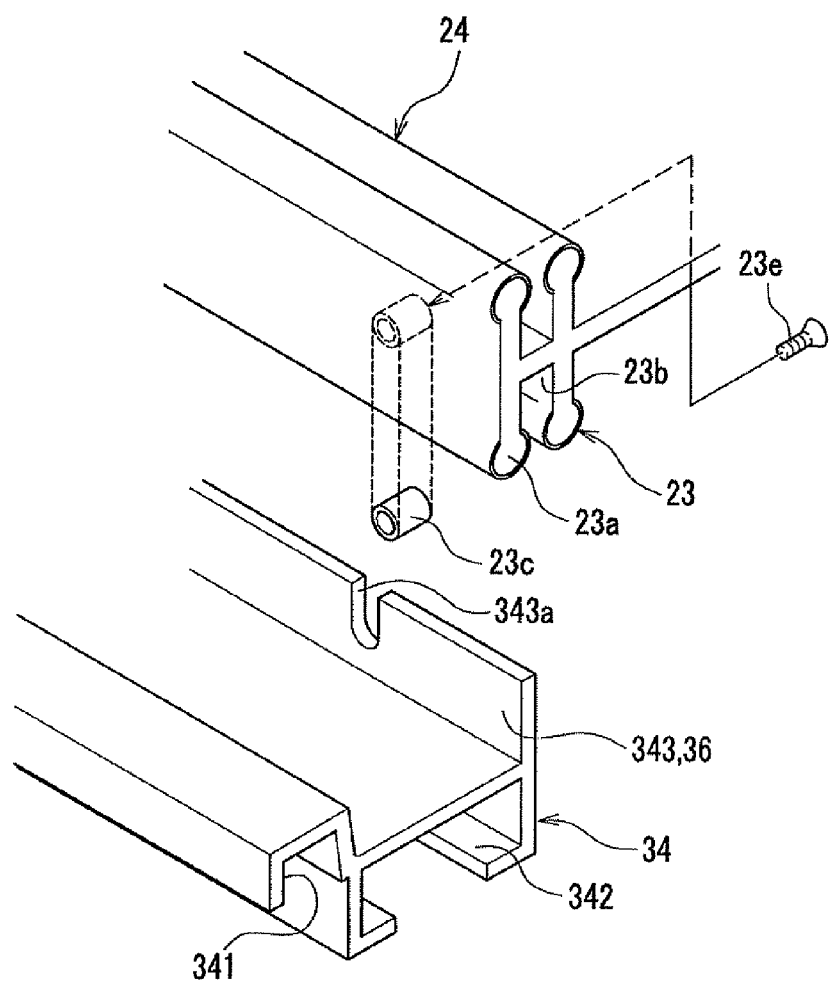
FIG. 7B is an exploded perspective view around the upper engagement portion.

Next, an anti-slip mechanism of the solar panel 3 will be described with reference to FIG. 7. FIG. 7A is an enlarged sectional view around the upper engaging portion, and FIG. 7B is an exploded perspective view around the upper engaging portion.

As shown in FIG. 7A, a cylindrical pin 23c is arranged inside the groove 23b of the upper engaging portion 23. A female screw is formed in a hollow portion of the pin 23c. A through hole 23d is formed in the protruding member 23a toward the wall surface W of the upper engaging portion 23. The pin 23c is fixed inside the groove 23b by screwing the screw 23e passed through the through hole 23d into the female screw in the hollow portion.

On the other hand, a protruding member 343 of the frame strip 34 constituting the upper engaged portion 36 of the solar panel 3 includes a notch 343a at a position corresponding to the pin 23c fixed inside the groove 23b. Thus, the pin 23c is designed to insert into the notch 343a when the upper engaging portion 23 is engaged with the protruding member 343, which is the upper engaged portion, by rotating the rotating portion 22 downwards (toward the solar panel 3).

The installation structure of exterior wall decorative sheet 1 relating to this embodiment is principally constituted as above-mentioned structure. Next, an assembling method and its function and effect of the installation structure of exterior wall decorative sheet 1 relating to this embodiment will be described with reference to FIG. 1 through 7.

In the beginning, in a factory manufacturing the runner 2, it is designed to install the plurality of runner-side connectors (refer to FIGS. 2 and 4) at a predetermined position under the runner 2, arrange the wire collection 6 in the hollow portion 25 of the runner 2, and connect in series to the plurality of runner-side connectors 4 through the wire collection 6. In this time, as the hollow portion 25 of the runner 2 becomes widely open in a longitudinal direction by rotating the rotating portion 22 upwards, a connection between the runner-side connector 4 and the wire collection 6 and a layout in the hollow portion 25 of the wire collection 6 can be easily done. As the wire collection 6 is arranged in the hollow portion 25, a waterproof property at the connection point between the wire collection 6 and the runner-side connector 4 can be greatly improved.

In addition, an installation work of the runner-side connector 4 and the wire collection 6 is not limited to a work carried out in factory, but may be carried out at a construction site.

Next, as shown in FIG. 2, at least one pair of runners 2 is installed on the wall surface W of a building BD with the runners 2 spaced vertically in a predetermined distance. In this time, the fastener 7 is initially installed at a position corresponding to the installation position of the runner 2. As shown in FIG. 3, the fastener 7 is adjusted shifting a concave curve 72c of the fastener 72 relative to the convex curve 73a of the adjustment washer 73 such that the horizontal strip 72b of the fastener 72 becomes horizontal. The bolt B for fastening the fastener 7 is initially installed in the engagement groove 21k of the runner 2. Thus, the runner 2 is easily fixed on the wall surface W.

Next, as shown in FIGS. 2 and 3, the protruding member 343 (refer to FIG. 5), which is the lower engaged portion 37 of the solar panel 3, is inserted into the groove 24b of the lower engaging portion 24 of the lower runner 2, which is a lower holding member among a pair of runners 2. Thus, the solar panel 3 is held at its lower side by the runner 2, which is a lower holding member.

In this time, in case where the rotating portion 22 of the upper runner 2, which is an upper holding member between a pair of runners 2, rotates upwards, an upper side of the solar panel 3 is not in contact with the upper runner 2. Accordingly, the lower engaging portion 24 of the lower runner 2 and the lower engaged portion 37 of the solar panel 3 can be easily engaged each other.

Next, as shown in FIGS. 2, 4, and 6, it is designed to insert the circumferential wall 51c into the concave portion 41b and connect the connection terminal 52 to the connection terminal 42 to press the panel-side connector 5 of the solar panel 3 against the runner-side connector 4 of the runner 2.

In this time, a connection between the panel-side connector 5 and the runner-side connector 4 can be visually confirmed in a condition that the rotating portion 22 of the upper runner 2 has been rotated upwards.

The first sealing member 53 and the second sealing member 54 provided in a side surface toward the wall surface of the panel-side connector 5 are pressed against the runner-side connector 4 to seal around the connection terminals 52, 42.

Next, as shown in FIGS. 2 and 3, it is constituted to insert the protruding member 343 (refer to FIG. 5) constituting the upper engaged portion 36 into the groove 23b of the upper engaging portion 23 by rotating the rotating portion 22 of the upper runner 2 downwards. Thus, the solar panel 3 is held at an upper side by the runner 2, which is an upper holding member. Accordingly, the solar panel 3 is prevented from moving upwards and is hard to be off from the runner 2 in case where the solar panel 3 is affected by upward load caused by an earthquake or the like.

The solar panel 3 is attracted to the runner when the protruding member 343 (refer to FIG. 5) constituting the upper engaged portion 36 is fitted into the groove 23b of the upper engaging portion 23 by rotating the rotating portion 22 of the upper runner 2 downwards. Then, the sealing property of the first sealing member 53 and the second sealing member 54 can be greatly improved.

Furthermore, as shown in FIG. 7, the pin 23c provided in the groove 23b is fitted into the notch 343a provided in the protruding member 343 when the protruding member 343 (refer to FIG. 5) constituting the upper engaged portion 36 is fitted into the groove 23b of the upper engaging portion 23 by rotating the rotating member 22 of the upper runner 2 downwards. Accordingly, the solar panel 3 cannot be moved in a longitudinal direction of the runner 2 relative to the upper runner 2, which is the upper holding member. Then, the solar panel 3 is not moved relative to the upper runner 2, which is the upper holding member, in case where horizontal load has affected on the solar panel 3 caused by, for example, an earthquake. As a result, it is effectively prevented that large loads have affected at connection points between the panel-side connector 5 and the runner-side connector 4, and also a disconnection or a failure of the panel-side connector 5 and the runner-side connector 4 can be effectively prevented.

On the other hand, the solar panel 3 is installed to be relatively movable (slidable) in a longitudinal direction of the runner 2 relative to a lower runner 2, which is the lower holding member. As a result, the solar panel 3 moves relative to the lower runner 2 in case where horizontal load has affected on the solar panel 3 caused by, for example, earthquake. Then, it can be made to ease the load affecting on each connection point between members by escaping the force caused by earthquake, and a failure of the solar panel 3 can be effectively prevented.

In this way, a first stage of the installation structure of exterior wall decorative sheet 1 is completed by arranging a plurality of the solar panels 3 to be horizontally neighbored. As the upper runner 2, which is the upper holding member, includes a lower engaging portions 24, another solar panel 3 is further arranged on an upper side of the runner 2 regarding the runner 2 as a lower holding member. As a result, a second stage or a third stage of the installation structure of exterior wall decorative sheet 1 is sequentially constituted.

The runner 2 includes a connection portion 21p for connecting the scaffolding binder member 8 at a position corresponding to a gap between a pair of solar panels 3 neighboring in a horizontal direction. Then, the scaffolding binder member 8 can be easily fixed to the wall surface W through the runner 2 and the fastener 7.

As above mentioned, although the embodiment of the present invention has been described with reference to the drawings, the present invention is not limited to the above, but can be appropriately changed within a scope of a gist or an essence of the present invention.

For example, although the solar panel 3 has been used as an exterior wall decorative sheet in the above embodiment, it can be used even in case where an exterior wall decorative sheet without the solar cell element is installed. In this case, the exterior wall decorative sheet can be easily held at an upper side thereof by rotating the rotating member 22 of the runner 2 downwards.

Although the runner 2 has been constituted to include both the upper engaging portion 23 and the lower engaging portion 24 in the above embodiment, for example, in case where only one stage of the installation structure of exterior wall decorative sheet 1 is installed, it is not necessary to provide the upper engaging portion 23 in the runner 2 (corresponding to "lower holding member" in claim) installed under the solar panel 3, and also provide the lower engaging portion 24 in the runner 2 (corresponding to "upper holding member" in claim) installed over the solar panel 3.

Although it has been constituted to provide the groove 23b, 24b as the upper engaging portion 23 and the lower engaging portion 24 of the runner 2, and also provide the protruding member 343 as the upper engaged portion 36 and the lower engaged portion 37 of the solar panel 3 in the above embodiment, it can be constituted to provide the upper engaging portion 23 and the lower engaging portion 24 of the runner 2 to be formed like a protruding member, and provide the upper engaged portion 36 and the lower engaged portion 37 of the solar panel 3 to be formed like a groove.

What is claimed is:

1. An installation structure of exterior wall decorative sheet comprising;
   a plurality of exterior wall decorative sheets;
   a lower holding member fixed to a wall surface of a building and holding the plurality of exterior wall decorative sheets at a lower side thereof;
   an upper holding member fixed to the wall surface of the building and holding the plurality of exterior wall decorative sheets at an upper side thereof,
   wherein
   the upper holding member comprises:
      a fixed portion fixed to the wall surface,
      a rotating portion fixed vertically and rotatably to a hinged portion in the fixed portion, and
      an upper engaging portion
         formed in an extension portion extending toward the exterior wall decorative sheet of the fixed portion,
         engaging with the exterior wall decorative sheet when the rotating portion rotates downwards, and
         disengaging with the exterior wall decorative sheet when the rotating portion rotates upwards, and
      wherein
   the exterior wall decorative sheet is a solar panel including solar cell elements, and
   the upper holding member is fixed to the fixed portion and provided with a plurality of holding member-side connectors connecting respectively to the plurality of solar panels and a wire collection connecting among the plurality of holding member-side connectors, and wherein
   the solar panel is provided with a panel-side connector connecting to the holding member-side connector, and
   the holding member-side connector and the panel-side connector are, respectively, provided with mutually connecting connection terminals to surround around the connection terminal by one thereof and include a first sealing member being in contact with the other thereof.

2. The installation structure of exterior wall decorative sheet according to claim 1, wherein
   the holding member-side connector and the panel-side connector is constituted to extend one thereof over the first sealing member and include a second sealing member being in contact with the other thereof, and
   the second sealing member slants approaching closer to the first sealing member as it goes farther from a central position to either ends.

* * * * *